US012604300B2

(12) United States Patent
Chen et al.

(10) Patent No.: US 12,604,300 B2
(45) Date of Patent: Apr. 14, 2026

(54) PRIORITIZATION BETWEEN UPLINK AND SIDELINK COMMUNICATIONS

(71) Applicant: Apple Inc., Cupertino, CA (US)

(72) Inventors: Yuqin Chen, Beijing (CN); Vijay Venkataraman, San Jose, CA (US); Fangli Xu, Beijing (CN); Haijing Hu, Los Gatos, CA (US); Srirang A. Lovlekar, Fremont, CA (US); Murtaza A. Shikari, Mountain View, CA (US); Sethuraman Gurumoorthy, San Ramon, CA (US); Sree RaM Kodali, San Jose, CA (US); Longda Xing, San Jose, CA (US); Clive E. Rodgers, Palo Alto, CA (US); Srinivasan Nimmala, San Jose, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 17/755,486

(22) PCT Filed: Nov. 7, 2019

(86) PCT No.: PCT/CN2019/116208
§ 371 (c)(1),
(2) Date: Apr. 29, 2022

(87) PCT Pub. No.: WO2021/087853
PCT Pub. Date: May 14, 2021

(65) Prior Publication Data
US 2022/0394674 A1  Dec. 8, 2022

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/542* (2023.01);
(Continued)

(58) Field of Classification Search
CPC ............. H04W 72/569; H04W 72/543; H04W 28/0268; H04W 28/0278; H04W 4/40;
(Continued)

(56) References Cited

U.S. PATENT DOCUMENTS

2017/0367087 A1* 12/2017 Seo ........................ H04W 72/51
2018/0049220 A1  2/2018 Patil et al.
(Continued)

FOREIGN PATENT DOCUMENTS

CN  108811157  11/2018
CN  109478991 A  3/2019
(Continued)

OTHER PUBLICATIONS

Nokia et al., "Unresolved issues on SL and UL prioritization", 3GPP TSG-RAN WG2 Meeting #107bis, R2-1913147, Oct. 18, 2019, 4 sheets.
(Continued)

*Primary Examiner* — Yee F Lam
(74) *Attorney, Agent, or Firm* — Fay Kaplun & Marcin, LLP

(57) ABSTRACT

A method performed by a user equipment (UE) configured with an uplink and a sidelink. The method includes determining that a first set of data is to be transmitted in the uplink, assigning a priority value to the first set of data, determining that a second set of data is to be transmitted in the sidelink, assigning a priority value to the second set of data, determining that the first and second set of data are to be transmitted using a same resource at a same time, selecting one of the first set of data or the second set of data
(Continued)

to be transmitted first based on at least the first priority value and the second priority value and when the first set of data that is to be transmitted in the uplink is selected, transmitting the first set of data prior to transmitting the second set of data.

20 Claims, 5 Drawing Sheets

(51) Int. Cl.

| | | |
|---|---|---|
| *H04W 72/542* | (2023.01) | |
| *H04W 72/56* | (2023.01) | |
| *H04W 76/19* | (2018.01) | |
| *H04W 92/18* | (2009.01) | |

(52) U.S. Cl.
CPC .......... *H04W 72/56* (2023.01); *H04W 76/19* (2018.02); *H04W 92/18* (2013.01)

(58) Field of Classification Search
CPC . H04W 28/0875; H04W 92/18; H04W 76/10; H04W 74/0866; H04W 72/56; H04L 1/1887
See application file for complete search history.

(56) References Cited

U.S. PATENT DOCUMENTS

| | | | | |
|---|---|---|---|---|
| 2018/0234995 A1* | 8/2018 | Jung | .................. | H04W 72/569 |
| 2018/0317123 A1* | 11/2018 | Chen | .................... | H04W 72/21 |
| 2020/0059944 A1* | 2/2020 | Lee | ......................... | H04W 4/40 |
| 2020/0221467 A1* | 7/2020 | Huang | .................. | H04W 72/23 |
| 2020/0229198 A1* | 7/2020 | Kung | .................... | H04W 72/54 |
| 2021/0007002 A1* | 1/2021 | Kang | .................... | H04W 40/24 |
| 2021/0029723 A1* | 1/2021 | Wu | .................... | H04W 72/569 |
| 2021/0045138 A1* | 2/2021 | Kang | .................... | H04W 52/34 |
| 2021/0045178 A1* | 2/2021 | Kung | .................... | H04W 76/18 |
| 2021/0105790 A1* | 4/2021 | Lin | ...................... | H04W 72/56 |

FOREIGN PATENT DOCUMENTS

| | | | | |
|---|---|---|---|---|
| CN | 109891987 | 6/2019 | | |
| WO | 2018/074874 | 4/2018 | | |
| WO | 2018/074876 | 4/2018 | | |
| WO | WO-2018074876 A1 * | 4/2018 | .............. | H04W 4/40 |
| WO | 2019/127968 | 7/2019 | | |
| WO | 2020/006366 | 1/2020 | | |
| WO | 2021/022907 | 2/2021 | | |

OTHER PUBLICATIONS

Interdigital Inc., "Remaining Aspects of UL/SL Prioritization", 3GPP RAN WG2 Meeting #107bis, R2-1912871, Oct. 18, 2019, 4 sheets.
Ericsson, "Remaining Issues on UL-SL prioritization", 3GPP TSG-RAN WG2 Meeting #107bis, R2-1913326, Oct. 18, 2019, 3 sheets.
Huawei et al., "Further discussion on NR SL and NR UL prioritization", 3GPP TSG-RAN WG2 Meeting #107bis, R2-1913709, Oct. 18, 2019, 5 sheets.
ZTE Corporation et al., "Discussion on UL and SL prioritization", 3GPP TSG RAN WG2 Meeting #107bis, R2-1912380, Oct. 18, 2019, 5 sheets.
OPPO(rapporteur), "Summary of [106#77] UL/SL prioritization", 3GPP TSG0RAN WG2 Meeting #107bis, R2-1908717, Aug. 30, 2019, 23 sheets.
Lenovo et al., "Remaining issue for prioritization for NR V2X", 3GPP TSG-RAN WG2 Meeting #107bis, R2-1912913, Oct. 18, 2019, 3 sheets.
LG Electronics Inc., "Delivery of PC5-S signaling and PC5-RRC messages", 3GPP TSG-RAN WG2 #107bis, R2-1913828, Oct. 4, 2019, 4 sheets.
Catt, "In-device coexistence of LTE and NR sidelink", 3GPP TSG RAN WG1 Meeting #98bis, R1-1910331, Oct. 18, 2019, 3 sheets.
Session Chair (Samsung), "Report from session on LTE V2X and NR V2X", 3GPP TSG-RAN WG2 Meeting #107bis, R2-1914138, Oct. 18, 2019, 31 sheets.

* cited by examiner

Network Arrangement
100

IMS
150

Network
Services
Backbone
160

Cellular Core Network
130

Internet
140

5G NR-RAN
120

LTE-RAN
122

WLAN 124 gNB
120A eNB
122A

UE
110

UE
112

UE
110

205 — Processor

Communication
Link
Prioritization
Engine

235

210 — Memory
Arrangement

215 — Display Device

Transceiver — 225

220 — I/O Device

Other Components — 230

Table 500

| Priority Rank 505 | Type of Data 510 |
|---|---|
| 1 | Priority value > uplink threshold (x) |
| 2 | Priority value > sidelink threshold (y) |
| 3 | Priority value < uplink threshold (x) |
| 4 | Priority value < sidelink threshold (y) |

Fig. 5

PRIORITIZATION BETWEEN UPLINK AND SIDELINK COMMUNICATIONS

BACKGROUND

A user equipment (UE) may establish a connection to at least one of multiple different networks or types of networks. To establish the connection and perform the full scope of functionalities normally available to the UE via the network connection, the UE may camp on a cell of a corresponding network. When connected, the UE may be configured with a downlink which is used to receive information and/or data from the cell and an uplink which is used to send information and/or data to the cell.

The UE may also communicate directly with a further UE via a sidelink. The term sidelink refers to a communication link that may be utilized for device-to-device communication (D2D). The UE may be configured with both an uplink and a sidelink simultaneously. From the UE perspective, uplink and sidelink communications may utilize the same resources (e.g., frequency, hardware, etc.). During operation, scenarios may arise in which an uplink transmission and a sidelink transmission are scheduled to use the same resource at the same time. As a result, the UE has to prioritize between the uplink transmission and the sidelink transmission.

SUMMARY

Exemplary embodiments include a method performed by a user equipment (UE) configured with an uplink and a sidelink. The method includes determining that a first set of data is to be transmitted in the uplink, assigning a priority value to the first set of data, determining that a second set of data is to be transmitted in the sidelink, assigning a priority value to the second set of data, determining that the first set of data and the second set of data are to be transmitted using a same resource at a same time, selecting one of the first set of data that is to be transmitted in the uplink or the second set of data that is to be transmitted in the sidelink based on at least the first priority value and the second priority value and when the first set of data that is to be transmitted in the uplink is selected, transmitting the first set of data prior to transmitting the second set of data.

In other exemplary embodiments, a user equipment (UE) that includes a transceiver and a processor is described. The transceiver is configured to communicate via an uplink and a sidelink. The processor is configured to perform operations that include determining that a first set of data is to be transmitted in the uplink, assigning a priority value to the first set of data, determining that a second set of data is to be transmitted in the sidelink, assigning a priority value to the second set of data, determining that the first set of data and the second set of data are to be transmitted using a same resource at a same time, selecting one of the first set of data that is to be transmitted in the uplink or the second set of data that is to be transmitted in the sidelink based on at least the first priority value and the second priority value and when the first set of data that is to be transmitted in the uplink is selected, transmitting the first set of data prior to transmitting the second set of data.

In still other exemplary embodiments, an integrated circuit is described. The integrated circuit includes circuitry configured to determine that a first set of data is to be transmitted in an uplink, circuitry configured to assign a priority value to the first set of data, circuitry configured to determine that a second set of data is to be transmitted in the sidelink, circuitry configured to assign a priority value to the second set of data, circuitry configured to determine that the first set of data and the second set of data are to be transmitted using a same resource at a same time and circuitry configured to select one of the first set of data that is to be transmitted in the uplink or the second set of data that is to be transmitted in the sidelink based on at least the first priority value and the second priority value.

BRIEF DESCRIPTION OF THE DRAWINGS

FIG. 5 shows a table for selecting between an uplink transmission and a sidelink transmission according to various exemplary embodiments.

DETAILED DESCRIPTION

Figure 1:
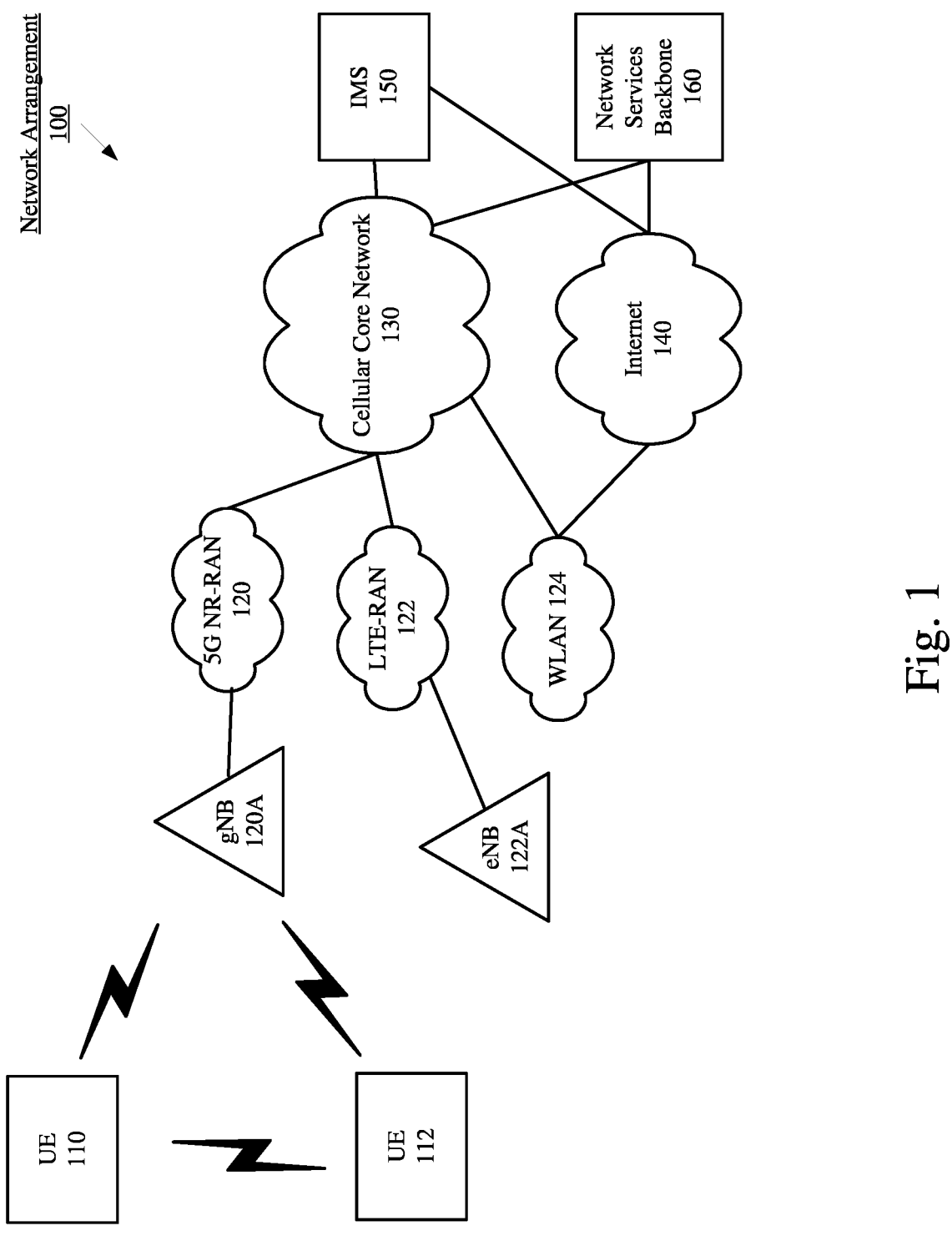
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods for implementing a mechanism at a user equipment (UE) that is configured to prioritize between the performance of an uplink transmission and a sidelink transmission.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

Some exemplary embodiments are described within the context of vehicle-to-everything (V2X) communications. V2X encompasses various types of communications such as, but not limited to, vehicle-to-vehicle (V2V), vehicle-to-infrastructure (V2I) and vehicle-to-network (V2N). These exchanges provide a vehicle with information of their surrounding environment that may be used in a variety of different applications, such as, but not limited to, collision warning, lane change warning, blind spot warning, approaching emergency vehicle notifications, traffic jam warning, platooning, etc. Accordingly, in some embodiments, the UE and the further UE may represent an electronic component that is incorporated within a vehicle (e.g., a connected car) or an external device that is configured to communicate (wired or wirelessly) with one or more of the vehicle's computer systems.

V2X is a type of communication supported by both the LTE and 5G new radio (NR) standards. Throughout this description any reference to a V2X component or function being associated with a particular type of network (e.g., LTE or 5G NR) is only provided for illustrative purposes. The exemplary embodiments may apply both LTE and 5G NR networks.

The exemplary embodiments are also described with regard to the UE being configured with multiple different types of communication links, e.g., a downlink, an uplink and a sidelink. From the perspective of the UE, the downlink is used to receive signals from a cell of a corresponding network and the uplink is used to send signals to the cell. The sidelink refers to a communication link between the UE and a further UE. The sidelink provides direct device-to-device (D2D) communication where information and/or data exchanged between the UE and the further UE via the sidelink does not go through the cell. The UE may be configured with a single sidelink that is used for communications to and from the further UE or the UE may be configured with a sidelink that is used to send signals to the further UE and a sidelink that is used to receive signals from the further UE.

Like V2X, the sidelink is supported by both LTE and 5G NR standards. In some scenarios, the network may provide information to the UE that indicates how the sidelink is to be established, maintained and/or utilized. In other scenarios, the sidelink is not under the control of the network. In either scenario, the UE and the further UE may still perform synchronization procedures, discovery procedures and exchange control information corresponding to the sidelink.

Within the context of V2X the sidelink may refer to V2V communications. However, the exemplary embodiments are not limited to V2X and may refer to any scenario in which the UE is configured with an uplink and a sidelink.

From the perspective of the UE, uplink and sidelink communications may utilize the same resources. For example, uplink and sidelink communications may be transmitted over the same frequency, use the same hardware (e.g., radio, TX chain, etc.), share a power budget, etc. During operation, a scenario may occur in which an uplink transmission and a sidelink transmission are configured to use the same resource at the same time. When this occurs, the UE may have to determine whether the uplink communication or the sidelink communication is to be allocated the resource first. This may cause the other communication to experience latency because the other communication must wait until the resource is available to perform the relevant operations.

The exemplary embodiments relate to implementing a mechanism for prioritizing between uplink and sidelink communications. As will be described below, this mechanism may allow the UE to avoid introducing latency to a transmission that the UE would prefer to perform over another transmission. For example, the UE may have data that is to be transmitted in the uplink that is related to multimedia entertainment and data that is to be transmitted in the sidelink that is related to a latency sensitive application (e.g., platooning). In this exemplary scenario, the mechanism may prioritize the sidelink transmission to avoid introducing latency to the latency sensitive application.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G New Radio (NR) radio access network (5G NR-RAN) 120, a LTE radio access network (LTE-RAN) 122 and a wireless local access network (WLAN) 124. These types of networks support V2X and/or sidelink communication. However, the UE 110 may also communicate with other types of networks and the UE 110 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to a single gNB 120A is merely for illustrative purposes. The exemplary embodiments may apply to any appropriate number of gNBs. The UEs 110, 112 may also connect to the LTE-RAN 122 via the eNB 122A.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate with one another directly using a sidelink. The sidelink is a direct D2D communication link. Thus, the information and/or data transmitted directly to the other endpoint (e.g., the UE 110 or the UE 112) does not go through a cell (e.g., gNB 120A, eNB 122A). As will described below with regard to FIG. 3, in some embodiments the UEs 110, 112 may receive information from a cell regarding how the sidelink is to be established, maintained and/or utilized. Thus, a network (e.g., the 5G NR-RAN 120, LTE-RAN 122) may control the sidelink. In other embodiments, the UEs 110, 112 may control the sidelink. Regardless of how the sidelink is controlled, the UEs 110, 112 may maintain an uplink to a currently camped cell (e.g., gNB 120A, eNB 122A) and a sidelink to the other UE simultaneously.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
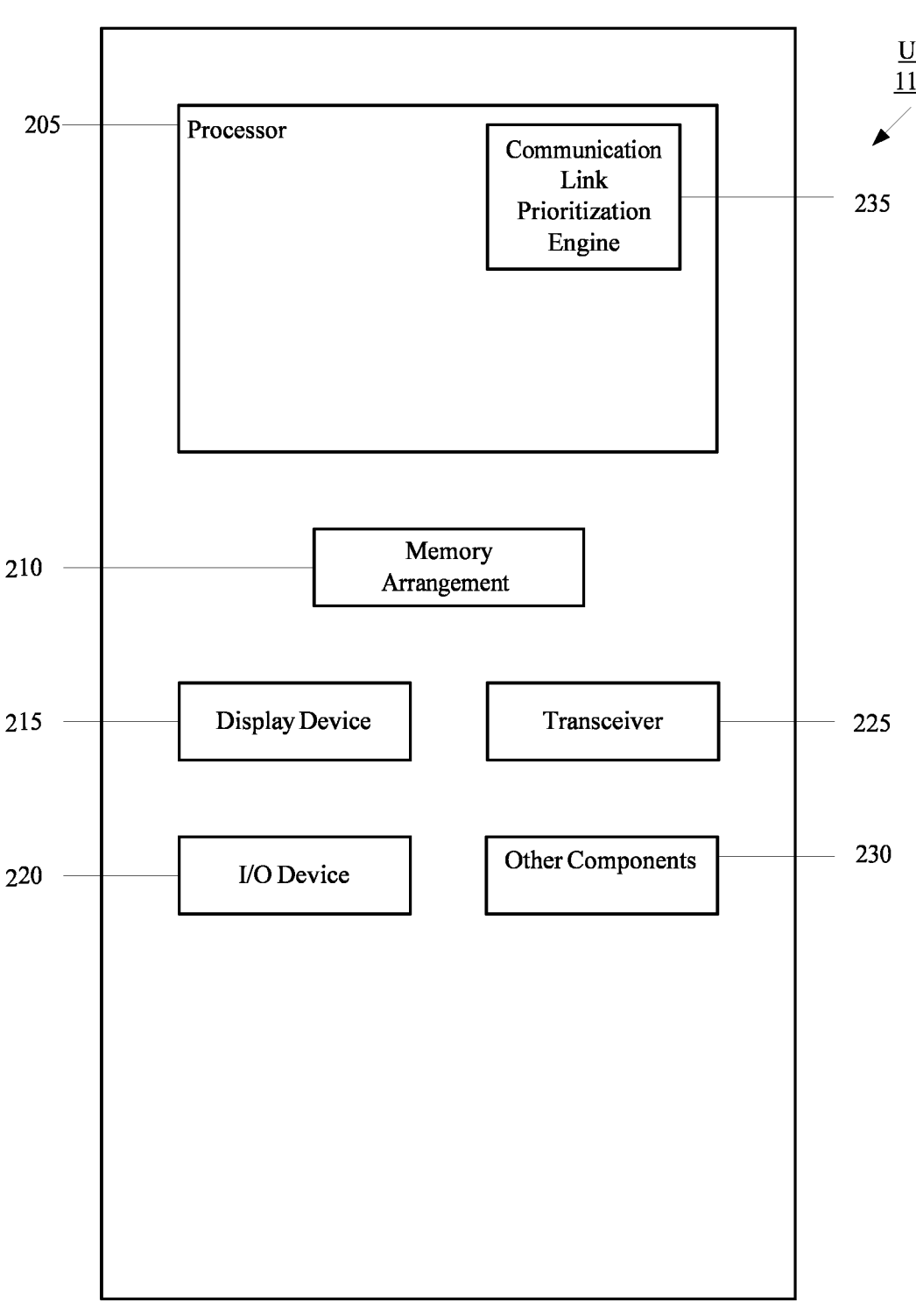
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225, an antenna panel 230 and other components 235. The other components 235 may include, for example, a SIM card, an embedded SIM (eSIM), an audio input device, an audio output device, a power supply, a data acquisition device, ports to electrically connect the UE 110 to other electronic devices, etc. The UE 110 illustrated in FIG. 2 may represent the UE 112.

As mentioned above, the UE 110 may be a component of a connected car or may be configured to exchange information with a connected car. Thus, the UE 110 may also include a communication interface to receive data from and send data to other components and/or systems of a connected car. However, any reference to the UE 110 being a particular electronic component or device is only provided for illustrative purposes. Those skilled in the art will understand that the UE 110 may represent any electronic component that is capable of maintaining an uplink and a sidelink simultaneously.

The processor 205 may be configured to execute a plurality of engines of the UE 110. For example, the engines may include a communication link prioritization engine 235. The communication link prioritization engine 235 may identify when two communication links are configured to use the same resources at the same time and determine which communication link the resource is to be allocated to first.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

Figure 3:
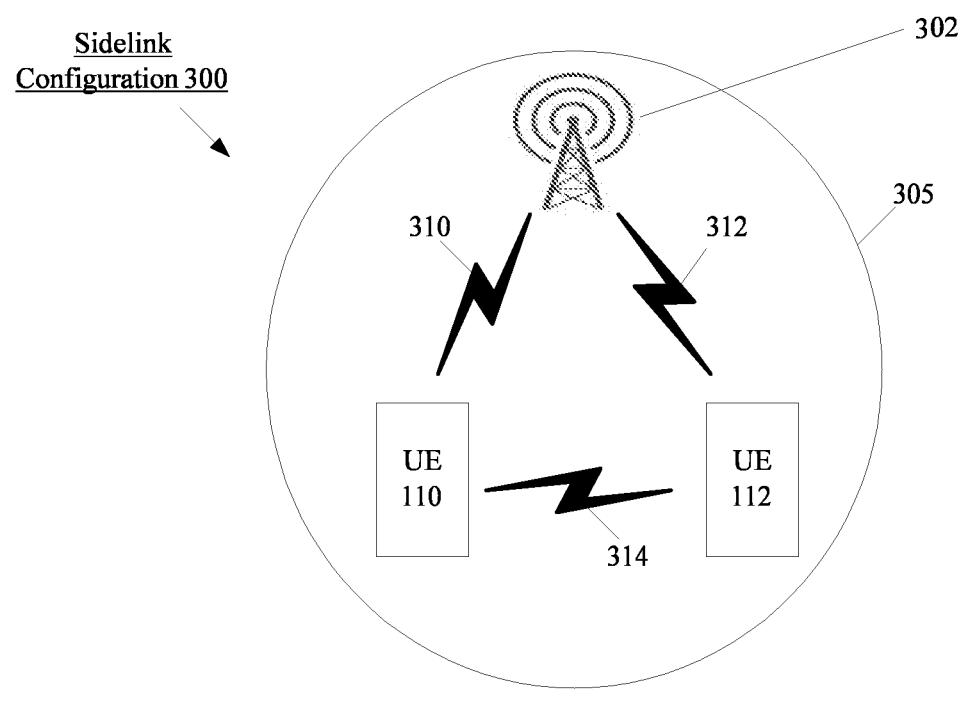
FIG. 3 shows two different sidelink configurations according to various exemplary embodiments.
Figure 3:
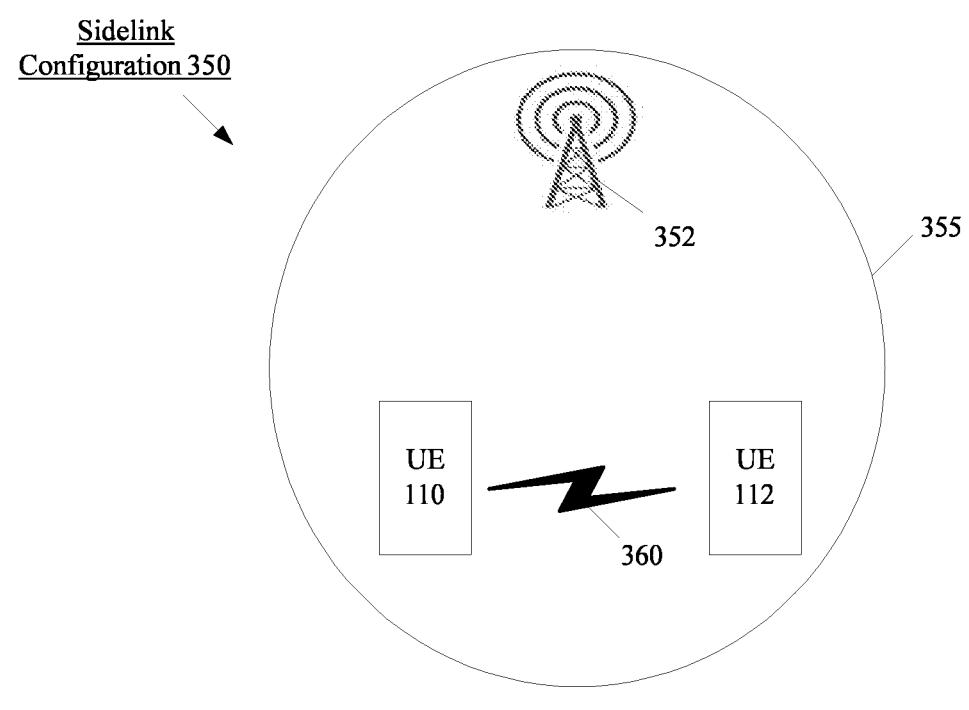

FIG. 3 shows two different sidelink configurations 300, 350 according to various exemplary embodiments. The sidelink configurations 300, 350 are described with regard to the network arrangement 100 of FIG. 1 and the UE 110 of FIG. 2.

Sidelink configuration 300 illustrates a coverage area 305 operated by the cell 302. The UEs 110, 112 are located within the coverage area 305. In the sidelink configuration 300, a network of the corresponding cell (e.g., 5G NR, LTE) is controlling the sidelink 314 between the UE 110 and the UE 112. Controlling the sidelink 314 may include allocating radio resources that are to be utilized for sidelink communications and providing control information that indicates how the sidelink 314 is to be established maintained and/or utilized. Thus, the UE 110 communicates with the network via the cell 302 using the network connection 310. The UE 114 also communicates with the network via the cell 302 using the network connection 312. Communications between the UEs 110, 112 over the sidelink 314 do not go through the cell 302. Both the UEs 110, 112 may have downlink and uplink communications with the cell 302 that are unrelated to the sidelink 314.

Sidelink configuration 350 illustrates a coverage area 355 operated by the cell 352. The UEs 110, 112 are located within the coverage area 355. Unlike the sidelink configuration 300, in the sidelink configuration 350, the network does not control the sidelink 360. Instead, the UEs 110, 112 may establish, maintain and/or utilize the sidelink 360 in accordance with preconfigured settings. The sidelink configuration 350 does not show the UEs 110, 112 as having their own network connections, however, this is only intended to convey that the network is not controlling the sidelink 360. The UEs 110, 112 may still communicate with the network in the downlink and the uplink via the cell 352.

The sidelink configurations 300, 350 are only provided to demonstrate that there are different ways to control a sidelink and are not intended to limit the exemplary embodiments in any way. The sidelink configurations 300, 350 may be applicable to both the 5G NR-RAN 120 and the LTE-RAN 122. As will be described below, how the UE 110 prioritizes between uplink communications and sidelink communications may be related to which sidelink configuration 300, 350 is being utilized.

Figure 4:
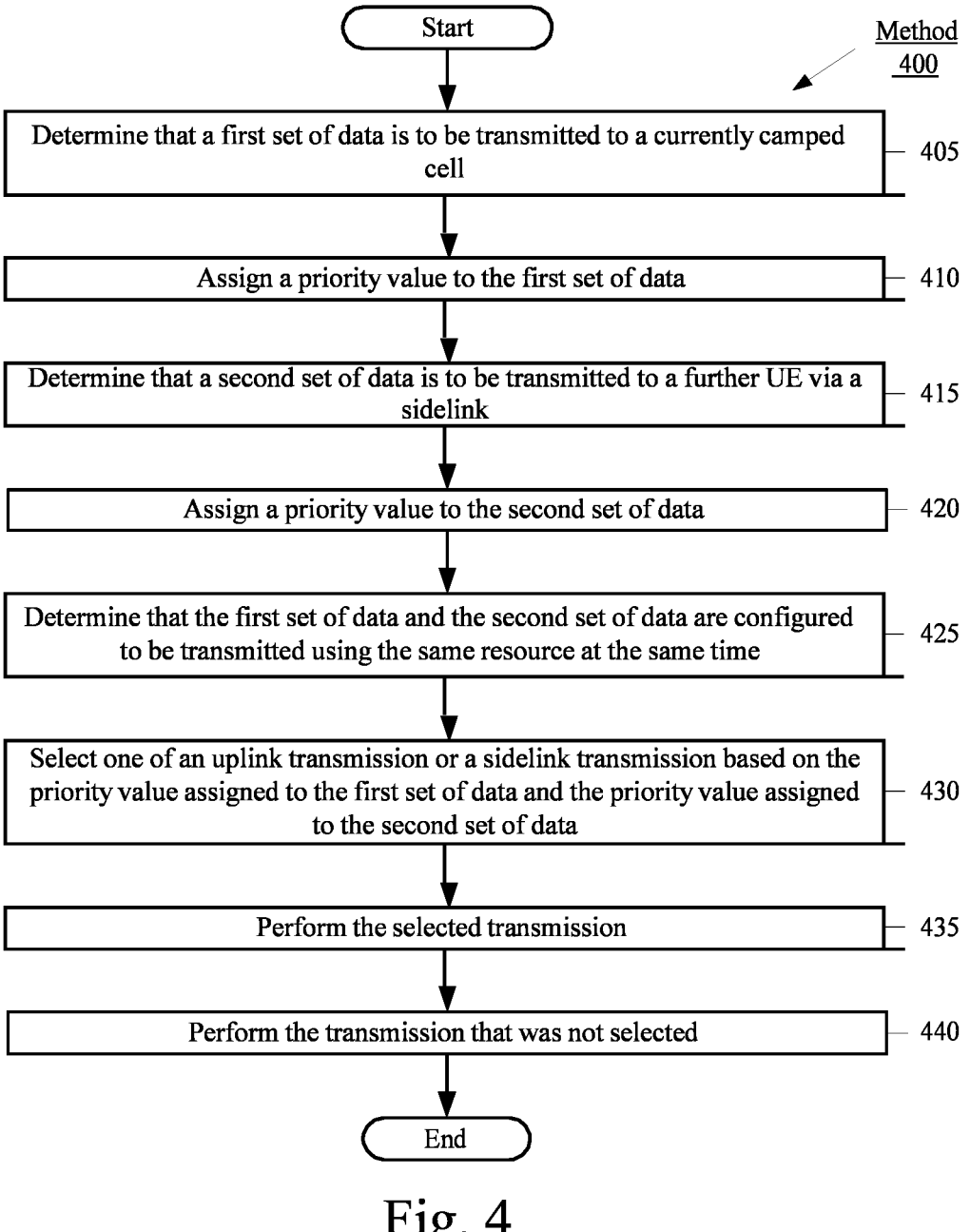
FIG. 4 shows a method for prioritizing between uplink communications and sidelink communications according to various exemplary embodiments.

FIG. 4 shows a method 400 for prioritizing between uplink communications and sidelink communications according to various exemplary embodiments. The method 400 is described with regard to the network arrangement 100 of FIG. 1 and the UE 110 of FIG. 2.

In 405, the UE 110 determines that a first set of data is to be transmitted to a currently camped cell. For example, the UE 110 may be currently camped on the eNB 120A. Any of a variety of different services may include the UE 110 transmitting information and/or data to the network via the currently camped cell.

In 410, the UE 110 assigns a priority value to the first set of data. The priority value assigned to the first set of data may be based on any of a variety of different factors. How the priority value assigned to the first set of data is determined will be described in more detail below. The method 400 is intended to provide a general overview of how the UE 110 may prioritize between uplink and the sidelink communications.

In 415, the UE 110 determines that a second set of data is to be transmitted to a further UE via the sidelink. Sidelink communications may relate to various services including, but not limited to, public safety services, emergency services, platooning management, multimedia entertainment, etc.

In 420, the UE 110 assigns a priority value to the second set of data. The priority value assigned to the second set of data may be based on any of a variety of different factors. How the priority value assigned to the second set of data is determined will be described in more detail below. As mentioned above, the method 400 is only intended to provide a general overview of how the UE 110 may prioritize between uplink and the sidelink communications.

In 425, the UE 110 determines that the first set of data and the second set of data are configured to be transmitted using the same resource at the same time. For example, the UE 110 may determine that an uplink transmission is to overlap in time with a sidelink transmission in the same or similar frequency. In another example, the UE 110 may determine that the uplink transmission and the sidelink transmission are configured to overlap in time and use the same hardware component (e.g., TX chain, radio, transceiver, antenna, etc.). In a further example, the UE 110 may determine that the uplink transmission and the sidelink transmission are to overlap in time and are associated with the same power budget. However, any reference to a particular resource is only provided for illustrative purposes. The exemplary embodiments may apply to any type of hardware, software, power or network resource associated with a transmission.

In 430, the UE 110 selects the uplink transmission or the sidelink transmission based on the priority value assigned to the first set of data and the priority value assigned to the second set of data. Subsequently, the UE 110 may allocate the relevant resources to the selected transmission. How the selection is performed will be described in more detail below. The method 400 is intended to provide a general overview of how the UE 110 may prioritize between uplink and the sidelink communications.

In some embodiments, the UE 110 may not assign the priority value to the first set of data and the second set of data until the UE 110 determines that the uplink transmission and the sidelink transmission are scheduled to overlap in time and utilize the same resource. Thus, the UE 110 may be configured to assign the priority value when a collision between uplink and sidelink communications are detected. In another embodiment, the UE 110 may assign the priority value to any set of data that is to be transmitted when the UE is configured with both an uplink and a sidelink. Thus, when a collision between uplink and sidelink communication is detected, the UE 110 may already possess the basis on which the prioritization is to be made. Accordingly, the exemplary embodiments apply to a priority value being assigned to a set of data before or after the collision between the uplink and the sidelink communication is detected.

In 435, the UE 110 performs the selected transmission. This includes allocating the resource identified in 425 to this transmission prior to the resource being allocated to the transmission that was not selected. In 440, the UE 110 performs the transmission that was not selected. This transmission may experience latency because the performance of this transmission may need to wait until the resource identified in 425 is available. Thus, the method 400 may be used to ensure that the transmission of data corresponding to a particular service or application may be prioritized over the transmission of other types of data.

The method 400 may be performed on a continuous basis. For example, a scenario may occur in which the UE 110 is triggered to transmit a further set of data over either the uplink or the sidelink while the transmission that was not selected in 430 is waiting to be performed. The transmission of the further set of data may be scheduled to overlap in time with the transmission of the second set of data and utilize the same resource. Thus, in this example, the UE 110 may utilize the method 400 to prioritize between the transmission of the second set of data and the transmission of the further set of data.

FIG. 5 shows a table 500 for selecting between an uplink transmission and a sidelink transmission according to various exemplary embodiments. The table 500 provides an example of how the UE 110 may perform the selection described in 430 of the method 400.

The table 500 includes a first column 505 that represents priority rank. A priority rank of 1 indicates that data is of the highest priority and its corresponding transmission is to be selected over any other transmission. A priority rank of 2 indicates that the data is of the second highest priority and its corresponding transmission is to be selected over any other transmission except for transmissions associated with priority rank 1. A priority rank of 3 indicates that the data is of the third highest priority and its corresponding transmission is to be selected over any other transmission except for transmissions associated with priority rank 1 and priority rank 2. A priority rank of 4 indicates that the data is of the lowest priority and its corresponding transmission is not to be selected over transmissions associated with priority rank 1, priority rank 2 and priority rank 3.

The table includes a second column 510 that describes the type of data associated with the priority rank shown in the same corresponding row. In this example, uplink data assigned a priority value that is greater than an uplink threshold (x) is associated with priority rank 1, sidelink data assigned a priority value that is greater than a sidelink threshold (y) is associated with priority rank 2, uplink data assigned a priority value that is less than the uplink threshold (x) is associated with priority rank 3 and sidelink data assigned a priority value that is less than the sidelink threshold (y) is associated with priority rank 4.

The UE 110 may reference the table 500 when selecting between an uplink transmission and a sidelink transmission. A general example of how the UE 110 may utilize the table 500 is provided below. However, the table 500 is not intended to limit the exemplary embodiments in any way. For example, in other embodiments, the table 500 may be replaced by a function configured to serve a similar purpose, a table formatted in a different manner, the use of two or more uplink thresholds, the use of two or more sidelink thresholds, the use of five or more priority ranks, the use of a predetermined condition instead of a threshold, etc.

In this example, uplink communications are associated with the highest priority. This is to account for ultra-reliable low latency communication (URLLC) which is a 5G NR use case. URLLC may be used for services including, but not limited to, autonomous transportation. Thus, the UE 110 may be configured to prioritize the transmission of data associated with URLLC above the transmission of other types of data to avoid introducing latency to URLLC services. Accordingly, the uplink threshold (x) may be configured to indicate that data to be transmitted is related to uplink URLLC services.

In this example, the sidelink threshold (y) is configured to indicate high priority sidelink services such as, but not limited to, public safety services, emergency services, platooning, etc. Thus, the UE 110 will prioritize certain sidelink services over certain uplink services. However, the exemplary embodiments are not limited to data corresponding to URLLC always being the highest priority. The exemplary embodiments may apply to a table or similar mechanism being configured in any appropriate manner.

In some embodiments, the uplink threshold (x) may be based on the logical channel priority configured for data radio bearers (DRBs). For example, during operation, the priority value assigned to data that is to be transmitted in the uplink (e.g., the first set of data in the method 400) may be based on the logical channel priority associated with the DRB that is to deliver the data to the network when the data is transmitted. The uplink threshold (x) may be set at a value related to the logical channel priority for DRBs that ensures that data related to URLLC services is to exceed the threshold and data that is related to other services does not exceed the threshold. Therefore, if the data that is to be transmitted in the uplink is to be used for URLLC services it will be assigned a priority value that exceeds the uplink threshold (x) and if the data that is to be transmitted in the uplink is for a different service it will be assigned a priority value that is less than the uplink threshold (x).

The corresponding sidelink threshold (y) may be based on the logical channel priority configured for sidelink radio bearers (SLRBs). For example, during operation, the priority value assigned to data that is to be transmitted in the sidelink (e.g., the second set of data in the method 400) may be based on the logical channel priority associated with the SLRB that is to deliver the data to the further UE 112 when the data is transmitted. The sidelink threshold (y) is configured at a value related to the logical channel priority for SLRBs that ensures that data related to high priority services is to exceed the threshold and data that is related to other services does not exceed the threshold. Therefore, if data that is to be transmitted in the sidelink is to be used for a high priority service (e.g., public safety services, emergency services, platooning, etc.) it will be assigned a priority value that exceeds the sidelink threshold (y) and if the data that is to be transmitted in the sidelink is for a different service it will be assigned a priority value that is less than the sidelink threshold (y). In other embodiments, signaling radio bearers (SRBs) may be used instead of DRBs. Accordingly, in some embodiments, the logical channel priority for DRBs, SRBs and/or SLRBs may be leveraged to provide the basis for performing the selection between the uplink transmission and the sidelink transmission.

If the UE 110 is operating within the sidelink configuration 300, the network may configure the values for the uplink threshold (x) and the sidelink threshold (y). In the sidelink configuration 300, the network may configure the network bearer (e.g., Uu DRB) and the SLRB and thus, could also configure the values for the uplink threshold (x) and the sidelink threshold (y). During operation, the values for the uplink threshold (x) and the sidelink threshold (y) may be provided to the UE 110 during radio resource control (RRC) signaling, in a system information block (SIB) or in any other appropriate manner.

If the UE 110 is operating within the sidelink configuration 350, the values for the uplink threshold (x) and the sidelink threshold (y) may be provided by the V2X control function. The V2X control function is a network component that provides the UE 110 with the parameters for V2X communications. Thus, the values for the uplink threshold (x) and the sidelink threshold (y) may be provided when configuring V2X and used in scenarios in which the network is not controlling the sidelink.

In other embodiments, the uplink threshold (x) may be based on priority values configured for the quality of service (QoS) flow. For example, during operation, the priority value assigned to data that is to be transmitted in the uplink (e.g., the first set of data in the method 400) may be based on the default priority value represented by the configured 5G QoS Identifier (5QI). The uplink threshold (x) is configured at a value related to 5QIs that ensures that data related to URLLC services is to exceed the threshold and data that is related to other services does not exceed the threshold. Therefore, if the data that is to be transmitted in the uplink is to be used for URLLC services it will be assigned a priority value that exceeds the uplink threshold (x) and if the data that is to be transmitted in the uplink is for a different service it will be assigned a priority value that is less than the uplink threshold (x).

The corresponding sidelink threshold (y) may be based on priority values configured for QoS flow for sidelink communications. For example, in V2X, the direct communication interface (PC5) is associated with PC5 QoS identifiers (PQI).

During operation, the priority value assigned to data that is to be transmitted in the sidelink (e.g., the second set of data in the method 400) may be based on the default priority value represented by the configured PQI. The sidelink threshold (y) is configured at a value related to PQIs that ensures that data related to high priority services exceeds the threshold and data that is related to other services does not exceed the threshold. Therefore, if the data that is to be transmitted in the sidelink is to be used for a high priority service (e.g., public safety services, emergency services, platooning, etc.) it will be assigned a priority value that exceeds the sidelink threshold (y) and if the data that is to be transmitted in the sidelink is for a different service it will be assigned a priority value that is less than the sidelink threshold (y). Accordingly, in some embodiments, the 5QIs and/or PQIs may be leveraged to provide the basis for performing the selection between the uplink transmission and the sidelink transmission.

In some embodiments, when the selection is related to QoS flow, the values for the uplink threshold (x) and the sidelink threshold (y) are related to QoS flow may be provided by the V2X function. Alternatively, for any type of threshold and any type of sidelink configuration, the threshold values may be a standards-based value.

In other embodiments, certain predetermined conditions may be incorporated into the selection between the uplink transmission and the sidelink transmission. For instance, data that is to be transmitted in the uplink that is associated with certain types of Uu SRBs (e.g, network SRBs) may be assigned a certain priority. To provide an example with regard to the table 500, the UE 110 may be configured to assign data that is to be transmitted in the uplink that is associated with SRB1 and/or SRB3 a priority value that is configured to always satisfy the uplink threshold (x) and thus, be associated with a priority rank 1.

Another predetermined condition may relate to a URLLC buffer status report (BSR). For instance, a URLLC BSR medium access control (MAC) control element (CE) may be assigned a certain priority. To provide an example with regard to the table 500, the UE 110 may be configured to assign a BSR MAC CE associated with URLLC a priority value that is configured to always satisfy the uplink threshold (x) and thus, be associated with a priority rank 1. Similarly, a beam failure recovery (BFR) MAC CE may be assigned a certain priority because it used for recovering the Uu downlink. To provide an example with regard to the table

500, the UE 110 may be configured to assign a BFR MAC CE a priority value that is configured to always satisfy the uplink threshold (x) and thus, be associated with a priority rank 1.

The sidelink may also be associated with similar predetermined conditions. For example, data related to PC5-S which is the signaling protocol stack for control plane signaling over the PC5 may be assigned a certain priority. To provide an example with regard to the table 500, the UE 110 may be configured to assign data that is to be transmitted in the sidelink that is associated with PC5-S a priority value that is configured to always satisfy the sidelink threshold (y) and thus, be associated with a priority rank 2.

Similarly, data related to sidelink SRBs may also be assigned a certain priority. To provide an example, with regard to the table 500, the UE 110 may be configured to assign data that is to be transmitted over the sidelink SRB a priority value that is configured to always satisfy the sidelink threshold (y) and thus, be associated with a priority rank 2.

The predetermined conditions mentioned above may be incorporated independently or may be incorporated as a unified scheme. Thus, the UE 110 may be configured to prioritize data that is to be transmitted in the uplink that is associated with SRB1, SRB3, BSR MAC CE or a BFR MAC CEs over the uplink threshold (x) and data that is to be transmitted in the sidelink that is associated with sidelink SRBs and PC5-S signaling over the sidelink threshold (y).

Instead of using the thresholds described above, the UE 110 may perform a direct comparison between the priority value assigned to the data to be transmitted in the uplink (e.g., first set of data in the method 400) and the priority value assigned to the data to be transmitted in the sidelink (e.g., second set of data in the method 400). This comparison may be based on information received from the network. For instance, the network may provide the UE 110 with priority a value that is to be assigned to data that satisfies a predetermined condition. These values may be provided to the network in an RRC reconfiguration message that is provided to the UE 110 during SLRB configuration or any other appropriate manner.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent

What is claimed:

1. A method, comprising:
   at a user equipment (UE) configured with an uplink and a sidelink:
      determining that a first set of data is to be transmitted in the uplink, wherein the first set of data comprises at least a buffer status report (BSR) medium access control (MAC) control element (CE);
      assigning a first priority value to the first set of data, wherein the first priority value is associated with a first threshold;
      determining that a second set of data is to be transmitted in the sidelink;
      assigning a second priority value to the second set of data, wherein the second priority value is associated with a second threshold;
      determining that the first set of data and the second set of data are to be transmitted using a same resource at a same time, wherein the UE is configured to prioritize the second set of data when (i) the first priority value assigned to the first set of data is equal to or greater than a first threshold and (ii) the second priority value assigned to the second set of data is less than a second threshold;
      prioritizing the first set of data based on the BSR MAC CE that is to be transmitted in the uplink regardless of whether (i) the first priority value assigned to the first set of data is equal to or greater than the first threshold and whether (ii) the second priority value assigned to the second set of data is less than the second threshold; and
   transmitting the first set of data prior to transmitting the second set of data, based on prioritizing the first set of data.

2. The method of claim 1, wherein the first threshold is associated with a 5G quality of service (QOS) identifier.

3. The method of claim 1, wherein the first threshold is associated with a logical channel priority configured for data radio bearers (DRBs).

4. The method of claim 1, wherein a value of the first threshold is received from a vehicle-to-everything (V2X) control function.

5. The method of claim 1, wherein the second threshold is associated with a PC5 QOS identifier.

6. The method of claim 1, wherein the second threshold is associated with a logical channel priority configured for sidelink radio bearers (SLRBs).

7. The method of claim 1, wherein a value of the second threshold is received from a vehicle-to-everything (V2X) control function.

8. A user equipment (UE), comprising:
   a transceiver configured to communicate via an uplink and a sidelink; and
   a processor configured to perform operations, the operations comprising:
      determining that a first set of data is to be transmitted in the uplink, wherein the first set of data comprises at least a buffer status report (BSR) medium access control (MAC) control element (CE);
      assigning a first priority value to the first set of data, wherein the first priority value is associated with a first threshold;
      determining that a second set of data is to be transmitted in the sidelink;

assigning a second priority value to the second set of data, wherein the second priority value is associated with a second threshold;

determining that the first set of data and the second set of data are to be transmitted using a same resource at a same time, wherein the UE is configured to prioritize the second set of data when (i) the first priority value assigned to the first set of data is equal to or greater than a first threshold and (ii) the second priority value assigned to the second set of data is less than a second threshold;

prioritizing the first set of data based on the BSR MAC CE that is to be transmitted in the uplink regardless of whether (i) the first priority value assigned to the first set of data is equal to or greater than the first threshold and whether (ii) the second priority value assigned to the second set of data is less than the second threshold; and transmitting the first set of data prior to transmitting the second set of data, based on prioritizing the first set of data.

9. The UE of claim 8, wherein the first threshold is associated with a 5G quality of service (QOS) identifier.

10. The UE of claim 8, wherein the first threshold is associated with a logical channel priority configured for data radio bearers (DRBs).

11. The UE of claim 8, wherein the second threshold is associated with a PC5 QoS identifier.

12. The UE of claim 8, wherein the second threshold is associated with a logical channel priority associated configured for sidelink radio bearers (SLRBs).

13. The UE of claim 8, wherein a value of the first threshold is received from a vehicle-to-everything (V2X) control function.

14. The UE of claim 8, wherein a value of the second threshold is received from a vehicle-to-everything (V2X) control function.

15. An integrated circuit, comprising:

circuitry configured to determine that a first set of data is to be transmitted in an uplink, wherein the first set of data comprises at least a buffer status report (BSR) medium access control (MAC) control element (CE);

circuitry configured to assign a first priority value to the first set of data, wherein the first priority value is associated with a first threshold;

circuitry configured to determine that a second set of data is to be transmitted in a sidelink;

circuitry configured to assign a second priority value to the second set of data, wherein the second priority value is associated with a second threshold;

circuitry configured to determine that the first set of data and the second set of data are to be transmitted using a same resource at a same time, wherein a user equipment (UE) is configured to prioritize the second set of data when (i) the first priority value assigned to the first set of data is equal to or greater than a first threshold and (ii) the second priority value assigned to the second set of data is less than a second threshold;

circuitry configured to prioritize the first set of data based on the BSR MAC CE that is to be transmitted in the uplink regardless of whether (i) the first priority value assigned to the first set of data is equal to or greater than the first threshold and whether (ii) the second priority value assigned to the second set of data is less than the second threshold; and transmitting the first set of data prior to transmitting the second set of data, based on prioritizing the first set of data.

16. The integrated circuit of claim 15, wherein the first threshold is associated with a 5G quality of service (QOS) identifier.

17. The integrated circuit of claim 15, wherein the second threshold is associated with a PC5 QoS identifier.

18. The integrated circuit of claim 15, wherein the first threshold is associated with a logical channel priority configured for data radio bearers (DRBs).

19. The integrated circuit of claim 15, wherein the second threshold is associated with a logical channel priority configured sidelink radio bearers (SLRBs).

20. The integrated circuit of claim 15, wherein a value of the first threshold and a value of the second threshold is received from a vehicle-to-everything (V2X) control function.

* * * * *